United States Patent [19]
Giles

[11] Patent Number: 5,991,337
[45] Date of Patent: Nov. 23, 1999

[54] METHOD AND APPARATUS FOR IMPROVING THE SIGNAL-TO-NOISE RATIO OF LOW-MAGNITUDE INPUT SIGNALS IN MODEMS

[75] Inventor: Rick Giles, Sandy, Utah

[73] Assignee: 3Com Corporation, Santa Clara, Calif.

[21] Appl. No.: 08/976,698

[22] Filed: Nov. 24, 1997

[51] Int. Cl.[6] ..................................................... H04B 1/38
[52] U.S. Cl. .......................... 375/222; 375/296; 375/298; 375/346; 455/63
[58] Field of Search ..................................... 375/222, 227, 375/296, 346, 298; 348/388; 455/69, 63, 72

[56] References Cited

U.S. PATENT DOCUMENTS

| | | | |
|---|---|---|---|
| 3,656,108 | 4/1972 | Arbuckle et al. | 375/222 |
| 4,295,223 | 10/1981 | Shutterly | 455/72 |
| 5,048,054 | 9/1991 | Eyuboglu | 375/222 |
| 5,202,755 | 4/1993 | Yang et al. | 348/388 |
| 5,463,661 | 10/1995 | Moran et al. | 375/222 |
| 5,790,594 | 8/1998 | Peng | 375/222 |
| 5,802,446 | 9/1998 | Giorgi et al. | 455/69 |

*Primary Examiner*—Stephen Chin
*Assistant Examiner*—Chieh M. Fan
*Attorney, Agent, or Firm*—Workman, Nydegger & Seeley

[57] ABSTRACT

A method and apparatus for improving the signal-to-noise ratio of low-magnitude input signals that coincide with a noise band of channel noise introduced into the transmission of data across a communication channel. A transmitting and receiving modem establish a communication channel for facilitating the exchange of input signals. The receiving modem evaluates the noise spectrum of the communication channel on a dynamic basis at the commencement of the exchange of information. The transmitting modem suspends transmission while the receiving modem evaluates the noise band and magnitude of the noise information. The channel noise band and levels are transmitted from the receiving modem to the transmitting modem to generate pre-compensation modulation points that have an enhanced magnitude outside the channel noise. The enhanced low-magnitude input signal and all other signals are propagated across the communication channel and exposed to the channel noise. The signal-to-noise ratio of the low-magnitude signal is improved due to the magnitude enhancement of the susceptible signals prior to transmission.

17 Claims, 10 Drawing Sheets

METHOD AND APPARATUS FOR IMPROVING THE SIGNAL-TO-NOISE RATIO OF LOW-MAGNITUDE INPUT SIGNALS IN MODEMS

BACKGROUND OF THE INVENTION

1. The Field of the Invention

This invention relates generally to communication systems exchanging data between computers over a communication channel. More particularly, the invention relates to improving signal quality of transmitted signals in a noisy communication channel.

2. Present State of the Art

Digital communicating devices employ modulation techniques for transmitting data between a transmitting device such as a computer and a receiving device which also may take the form of a computer. In order to propagate such data between a transmitting computer and a receiving computer, digital information must be transformed into a propagatable format capable of traversing a communication channel. To conform with such a requirement, a transmitting computer employs a transmitting modem for converting digital data into an analog format capable of propagation across the communication channel. Likewise, a receiving computer employs a receiving modem for capturing or receiving the analog signals and converting them back to a digital format readable by the receiving computer.

As transmitting computers and receiving computers may be remotely located one from another, a variety of communication channels or networks are employed for facilitating the routing of the signals between the computers. In a communication system wherein a network is employed for routing between the transmitting computer and receiving computer, a unique communication channel is formed through which the modulated data is transmitted. Such a communication channel provides a unique conduit having inherent ambient noise therein. Therefore, input signals that are transferred from the transmitting computer to the receiving computer acquire the communication channel noise while passing therethrough.

While dedicated communication channels having an exclusive direct path between the transmitting computer and receiving computer may exhibit similar noise characteristics between successive communication sessions, the channel noise on such a communication channel may vary from session to session depending upon dynamic factors such as adjacent cross-talk, ambient noise exposure levels and electronic component aging associated with the coupled transmitters and receivers. While the dynamic communication channel noise envelope assumes a generally small profile, interconnection of the transmitting computer with the receiving computer through a dynamic switching network such as a public switched telephone network (PSTN) may provide a unique physical path for successive communication channels thereby exhibiting drastically dissimilar channel noise characteristics.

In modern communications systems that employ modems, various modulation techniques have arisen to maximize the data rate between a transmitting modem and a receiving modem. To facilitate the transfer of additional data in such a system, advanced modulation techniques have been employed to maximize the dynamic range of signals through a communication channel. Modern modulation techniques utilize changes in transmit signal magnitudes to designate digital words or patterns of bits. For example, quadrature amplitude modulation (QAM) employs both magnitude and phase characteristics of a signal to signify a symbol representing a series of data bits. Therefore, the transfer of signals having a high magnitude level traverse the communication channel with a signal level substantially higher or larger than those signals introduced by the communication channel in the form of channel noise. However, smaller magnitude signals generated by the transmitting modem generally exhibit a magnitude only marginally higher than those magnitudes exhibited by the channel noise. One measure of a signal's quality in a communications system is denoted by a signal-to-noise ratio. Receiving modems rely upon a favorable signal-to-noise ratio for reliably extracting valuable signals from the received composite signal that includes the derogatory effects of channel noise. In many instances, smaller magnitude input signal, may be obscured or incorrectly decoded by the receiving modem due to the marginal difference in signal levels between the low-magnitude input signals and the channel noise as perceived at the receiving modem.

Figure 1:
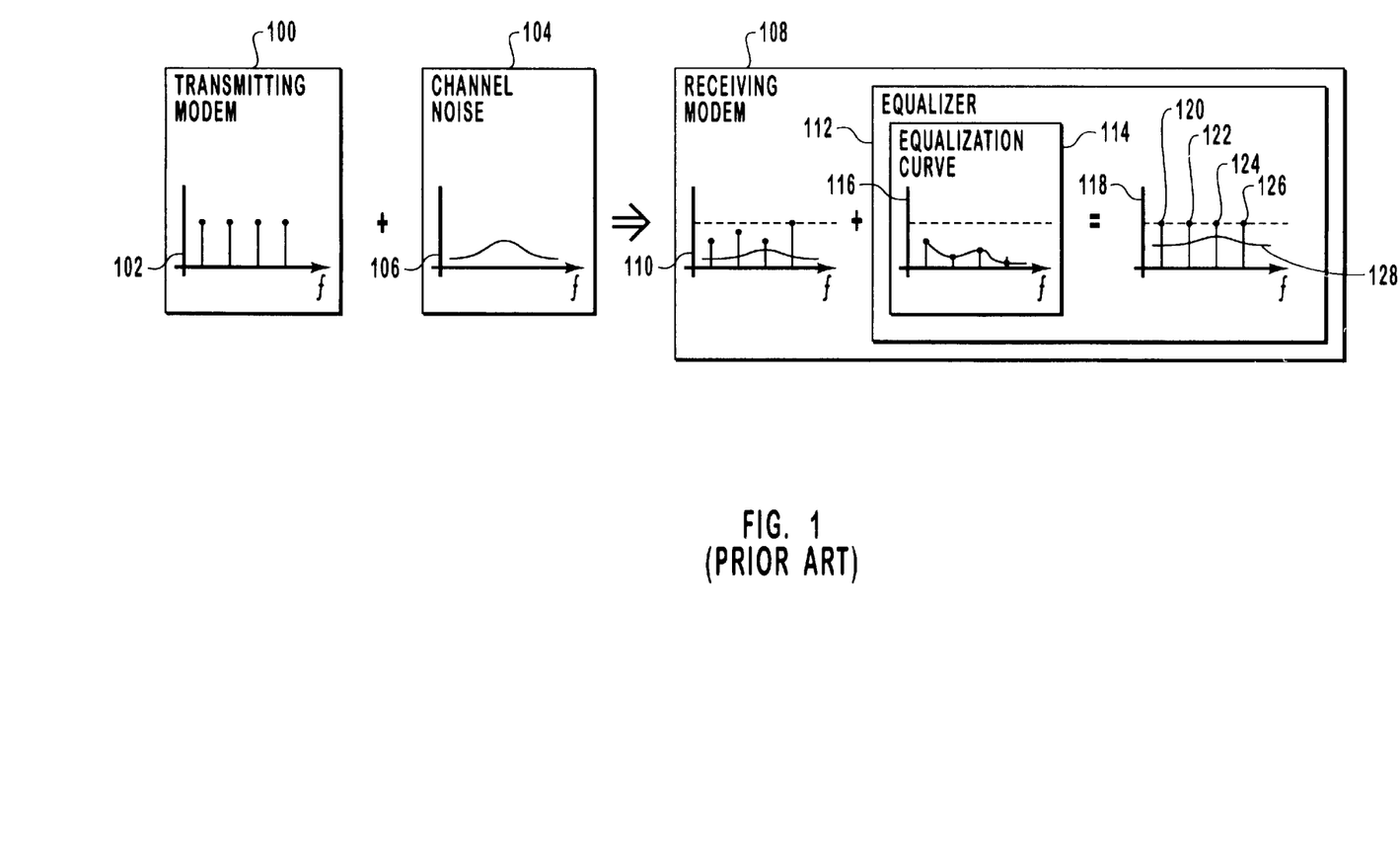
FIG. 1 is a simplified diagram of a prior art approach for equalization of a received input signal.

FIG. 1 depicts a prior art approach to equalizing signal levels for evaluation by a receiving modem. In FIG. 1, a transmitting modem 100 generates a series of bands of data represented as input signal 102. Such input signals if pristinely delivered to a receiving modem could be directly interpreted by the receiving modem with unity accuracy. However, as described above, input signal 102 traverses a communication channel before arriving at a receiving modem 108. The traversal of a communication channel 104 combines channel noise 106 with input signal 102. Furthermore, the traversal of input signal 102 through communication channel 104 subjects the various bands to inherently degrading effects which reduce the magnitudes of various bands of the input signal information. As a result, receiving modem 108 receives a received input signal 110 comprised of the degraded input signal mixed with the channel noise. Prior attempts to rectify the composite signal into a more usable and hence reliable form have employed an equalizer 112 for boosting or reduction of the received signal bands to an enhanced magnitude. Such an enhancement procedure is performed by employing a training process upon the initiation of the communication session to determine the derogatory effect of the communication channel on particular bands of information. Such a training process results in an equalization process 114 deriving an equalization curve 116 comprising the boosting or reduction of values used for enhancing the received input signal 110. The equalization process results in an equalized input signal 118 wherein frequency bands received by receiving modem 108 are enhanced prior to the extraction of the signal information from the input signal.

In FIG. 1, equalized input signal 118 depicts the received signal bands in their enhanced state. For example, band 120, 122, 124 and 126 are augmented to approximate the magnitudes exhibited by input signal 102. While such an equalization process provides suitable enhancement for bands having relatively small noise levels, bands coinciding with the channel noise bands do not result in as favorable condition as the other bands having smaller magnitude channel noise components. As depicted in FIG. 1, while band 122 is enhanced to approximate the magnitude of input signal 102 in the corresponding band, the channel noise injected by communication channel 104 is also enhanced as illustrated by enhanced channel noise 128. While the enhancement process improves the magnitude of band 122, the signal-to-noise ratio as evaluated at band 122 has not been improved. Therefore, extraction of the information in band 122 by the receiving modem has not been improved by employing such an equalization process.

Additionally, other prior art approaches to compensating for channel noise have employed a static equalization process wherein a static equalization curve is employed for all communication sessions between a transmitting modem and a receiving modem. While such a static equalization process may marginally suffice for a "standard" communication channel, the dynamic nature of modern communication systems introduce a very dynamic profile of channel noise.

Thus, what is needed is a method and apparatus for improving the signal-to-noise ratio of low-magnitude input signals occurring or coinciding with the channel noise band of a communication channel. Furthermore, what is desired is a method and apparatus for dynamically evaluating the communication noise resident on a communication channel and compensating for such channel noise to improve the signal-to-noise ratio available to a receiving modem in extracting the input signal from the combined input and channel noise signals.

SUMMARY AND OBJECTS OF THE INVENTION

It is an object of the present invention to provide a method and apparatus for improving the signal-to-noise ratio of low-magnitude input signals transmitted between a transmitting modem and a receiving modem during a communication session.

Another object of the present invention is to provide a method and apparatus for enhancing, at a transmitting modem, the signal levels of low-magnitude input signals coinciding with the channel noise band of the channel noise occurring in a communication channel.

Another object of the present invention is to provide a method and apparatus for receiving the enhanced low-magnitude input signal occurring in the channel noise band of the communication channel and to reduce both the enhanced low-magnitude input signal and the channel noise thereby improving the signal-to-noise ratio of the input signal.

A still further object of the present invention is to provide a method and apparatus for individually enhancing low-magnitude input signals occurring in the channel noise band and collectively equalizing input signal bands outside the channel noise band by mutually exchanging equalization training tones for determining corresponding magnitudes.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the objects, and in accordance with the invention as embodied and broadly described herein, a method and system for improving the signal-to-noise ratio of low-magnitude input signals occurring in the channel noise band of the communication channel is provided.

In a communication system, a communication channel is established between a transmitting modem and receiving modem for the purpose of exchanging an input signal therebetween. Communication channels exhibit a specific noise profile inherent from various physical factors such as ambient cross-talk, internal noise from transmitters and receivers, and antenna effects inherent to cabling in general and other electronic and electromagnetic effects further inherent to propagation theory. Attempts to categorically remedy such a condition using static compensatory factors provide a less optimal solution than employing a dynamic evaluation of the real time conditions of the newly established communication channel.

Upon the initial establishment of a communication channel, the transmitting and receiving modems may exchange equalization training tones to determine equalization bands and associated magnitudes necessary to bring the magnitudes of the received bands into an expected tolerance. Following an optional training process, the transmitting modem suspends any transmissions to the receiving modem to allow the receiving modem a brief period of time in which to monitor or "listen" to the communication channel to determine the ambient or background channel noise. Channel noise generally takes a Gaussian distribution having lower-magnitude signal levels and therefore may cause a diminutive signal-to-noise ratio of low-magnitude input signals coinciding with the frequency band of the channel noise.

The receiving modem as part of the initialization process evaluates the channel noise by performing a frequency evaluation such as a fast Fourier transform to determine a channel noise band and calculate compression level information for skewing modulation constellation points, such as those utilized in quadrature amplitude modulation, that reside in the channel noise band and have similar magnitudes. The channel noise band and compression level information, as determined by the receiving modem, are then forwarded to the transmitting modem for use in pre-compensation of the low-magnitude input signals coinciding with the channel noise band.

The transmitting modem thereafter employs the compression level information for boosting the low-magnitude input signals thereby creating a more favorable enhanced low-magnitude input signal level resulting in an improved signal-to-noise ratio between the enhanced low-magnitude signals and the channel noise as evaluated at the receiving modem. Such an improved signal-to-noise ratio at the receiving modem facilitates a more reliable extraction of the input signal from the presence of the induced channel noise.

The receiving modem receives the enhanced low-magnitude input signals coinciding with the channel noise band, low-magnitude input signals not coincidental with the channel noise band and high-magnitude input signals. The receiving modem reduces the magnitude of the received signals that coincide with the channel noise band, including the enhanced low-magnitude input signals and the channel noise. The receiving modem may additionally perform equalization on the other bands by using the equalization bands and corresponding magnitudes as determined in the equalization process performed during the initialization phase.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both method and apparatus for improving the signal-to-noise ratio of low-magnitude input signals which occur or coincide with the channel noise band associated with the communication channel. The purpose of the invention is to provide a means and method for separately evaluating the characteristics of the channel noise resident within a communication channel and separately enhancing or boosting such low-magnitude input signals prior to subjecting such signals to the contaminating effects of the channel noise within the communication channel. As used within this application, the term "modem" refers to any modulation/demodulation configuration including a discrete modem having digital signal processing performed thereon and other modem configurations performing host signal processing within the host system such as a personal computer. Also, as used within this application, the term "communication channel" includes within it's scope both a direct coupling or point-to-point coupling as well as network or matrix coupling of a transmitting modem with a receiving modem through such networks as a local area network, wide area network, Ethernet, public switch networks such as the public switch telephone network (PSTN) or other networks interfacing with a modem device. Furthermore, the term "computer" implies within its scope both personal and other forms of computers including portable and mobile implementations as well as embedded controller implementations.

Figure 2:
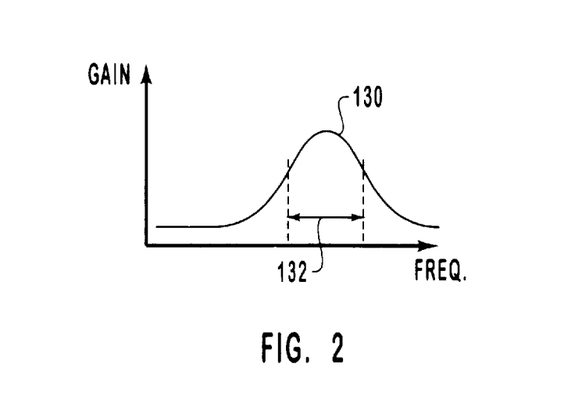
FIG. 2 is a simplified diagram depicting a typical channel noise profile, as employed by an embodiment of the present invention.

FIG. 2 depicts a typical communication channel noise profile. While communication channels may exhibit a variety of spurious noise levels from varying sources, ambient communication channel noise generally takes the profile of channel noise 130 exhibiting a generally Gaussian profile centered about a center frequency and having a noise bandwidth 132 which may span one or more information bands. The profile of channel noise 130 may be evaluated by performing a fast Fourier transform to determine the frequency components for evaluation in the frequency domain as depicted. An evaluation of channel noise 130 yields information such as a magnitude of channel noise 130 and noise bandwidth 132 for use in determining the magnitude and center frequencies about which the signal levels should be varied to improve the signal-to-noise ratio of low-magnitude input signals occurring within the channel noise band.

Figure 3:
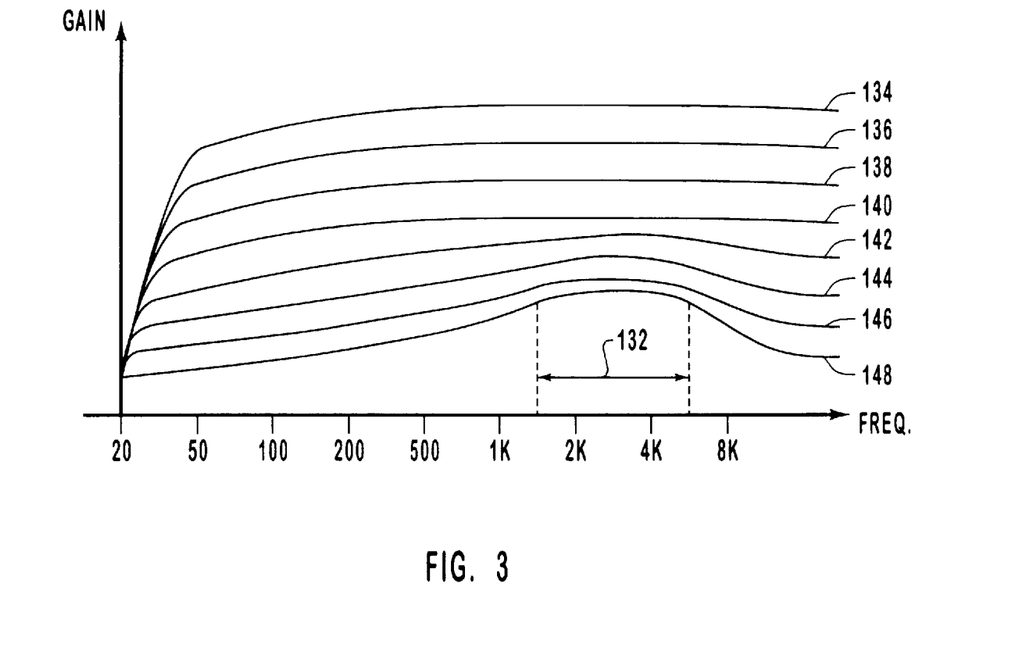
FIG. 3 depicts the enhancement of low-level input signals occurring in the channel noise band, in accordance with a preferred embodiment of the present invention.
Figure 4:
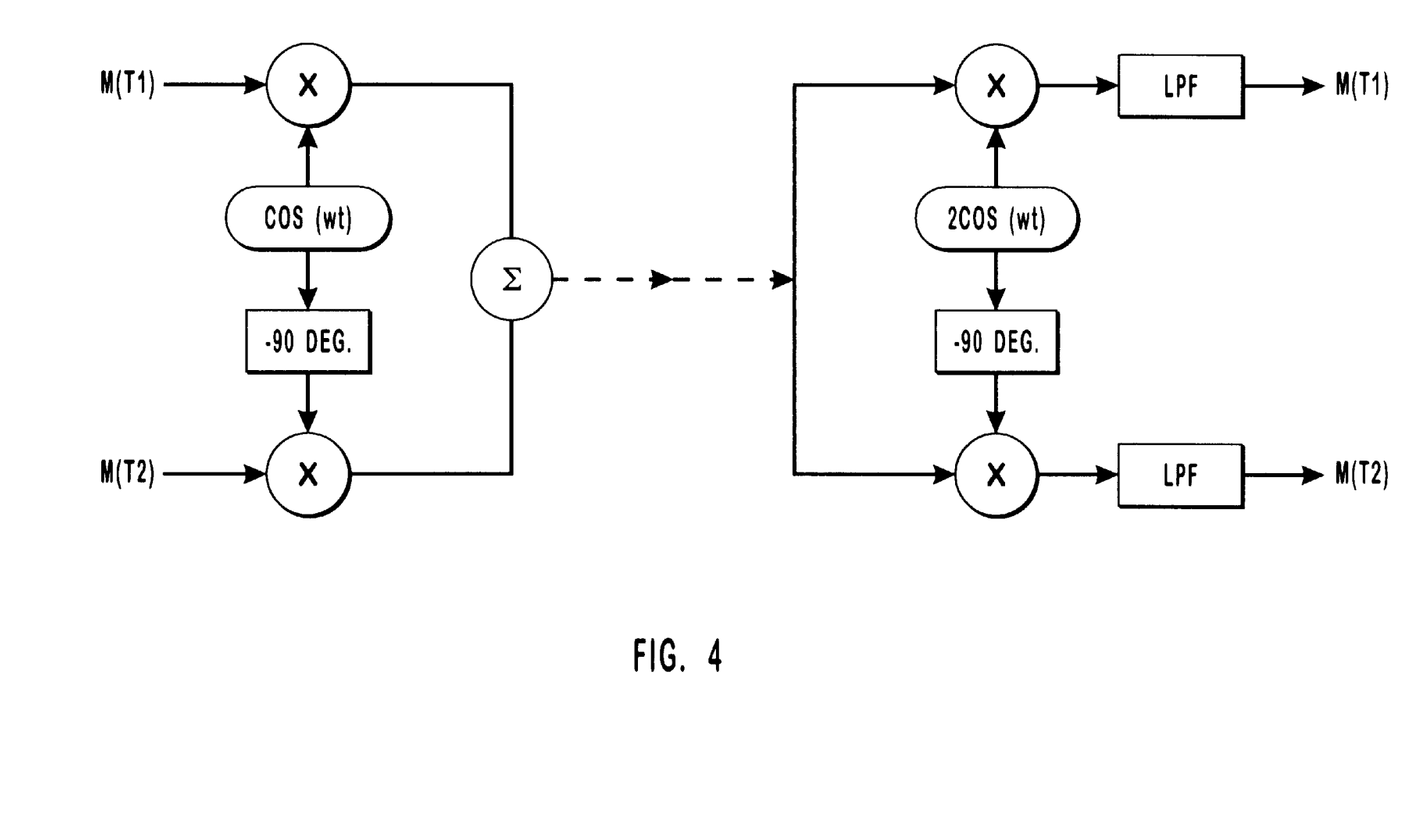
FIG. 4 depicts exemplary multiplexing employing Quadrature Amplitude Multiplexing (QAM), in accordance with a preferred embodiment of the present invention.

FIG. 3 depicts a graph of the compression of the magnitude of signal levels verses the frequency of such input signal levels, in accordance with a preferred embodiment of the present invention. FIG. 3 depicts a series of input signal levels 134–148. The amplitude, bandwidth, and noise band spectrum in FIG. 3 are shown for example only. Actual values are determined as described above. As described above, the present invention provides a method for improving the signal-to-noise ratio of low-magnitude input signals occurring or coinciding with the channel noise band. The present invention employs a pre- and post-equalization with the gain for the equalization based on the level and frequency of the input signal.

In the present invention, the transmit modem transmits low-level or low-magnitude data signals across the various bands of the input channel bandwidth. Low-magnitude input signals in the pass-band of the channeled noise are boosted in amplitude or magnitude by a amount determined during the channel or session initialization process as detailed in FIG. 16. Higher-level or larger-magnitude signals are boosted or enhanced by a lessor amount (i.e., the higher the magnitude of the input signal, the less enhancement is performed upon the input signal). Only the input signals coinciding or occurring in the dominate channel noise band are boosted or enhanced by the transmitting modem. Other input signals out of the channel noise band or high level input signals inside of the channel noise band may forgo equalization or in an alternate embodiment may be subjected to equalization as described in step 216 of FIG. 15. Upon receipt of the enhanced or boosted input signal, the receiving modem reduces the signal level of the enhanced frequencies in the channel noise band by a corresponding amount thereby approximating the original magnitude of the low-magnitude input signal occurring in the channel noise band.

FIG. 3 illustrates the compression of the lower-magnitude input signals, such as input signals 144–148, about the noise bandwidth 132. Such a boosting or enhancing of input signals about the channel noise band, improves the magnitude of the input signal prior to subjecting such an input signal to the channel noise. The effect of the process of the present invention is that the signal-to-noise ratio at the low-magnitude signal levels in the channel noise bandwidth is increased. The channel noise band and the compression level information associated with the amount of level boost are determined by the receiving modem during the initialization or training process as detailed in FIG. 16.

FIGS. 4–11 depict the operational characteristics of the preferred embodiment of the present invention that employs Quadrature Amplitude Multiplexing (QAM) as the preferred method of modulation. Quadrature Amplitude Multiplexing (QAM) uses two subcarriers for its modulation. Both carriers are the same frequency, but one is shifted in phase by 90 degrees from the other. Each carrier is multiplied by an input signal. The resulting modulated waves are then summed together. (See FIG. 4.) This resultant wave (see FIG. 5, wave N2) is transmitted to the distant receiver (de-multiplexer). The receiver demodulates the input signal using carriers of the same frequency and phase as were used for multiplexing. The resultant signals are low pass filtered (LPF) and then output. The respective de-multiplexer's outputs are now the equivalent of the multiplexer's inputs.

The output of the multiplexer is a subcarrier whose amplitude and phase is changed based on the input signals. At each phase/amplitude transition point (such as point T2 of FIG. 5, line N2) a large amount of broad band spectral energy is generated. This energy spectrum is representative of that particular transition time only. (See FIG. 6.) The transition points are sent and received and decoded at fixed intervals (i.e., T1, T2, T3, etc.), so that the decoder knows when it has an acceptable constellation point to decode. Unless the same phase and amplitude change is repeatedly sent, the spectrum energy is not necessary harmonically related to the carrier.

Figure 5:
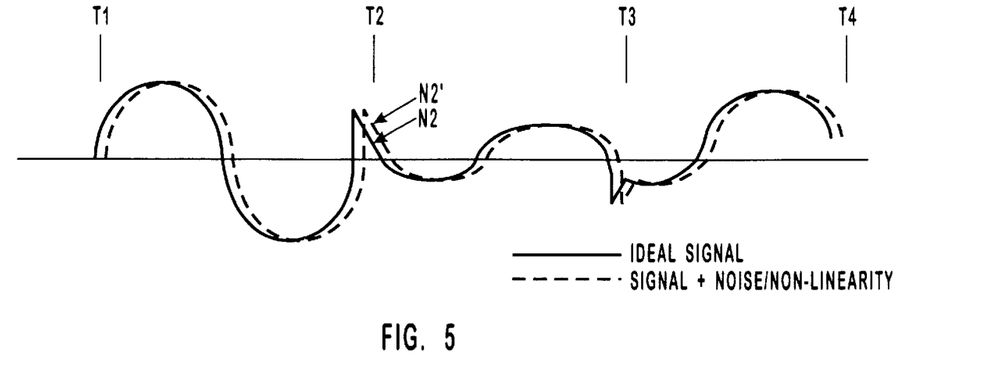
FIG. 5 depicts a graph of signal error as introduced by noise associated with the channel.
Figure 6:
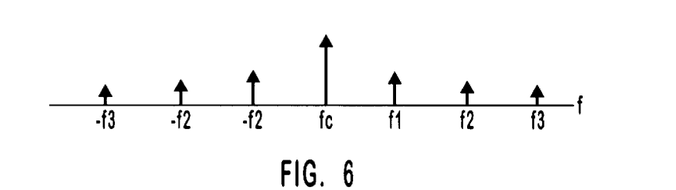
FIG. 6 depicts an ideal spectral plot of the energy during phase and amplitude transitions, in accordance with the present invention.

If the transmission path is non-linear or noise spectral energy is present, then the de-multiplexer would see the signal appearing as N2' of FIG. 5. The net result is a signal with a different amplitude, A', and phase, Ø'. When the de-multiplexer reverses the effect of the noisy signal, the constellation point is decoded into an incorrect vector location. As long as the effects of the non-linearity and noise are not too great, the receiving modem can still recover the constellation point. The area of acceptable error, around the constellation point, is called the "cloud of uncertainty." Any vector point, within this "cloud," will be decoded as the same constellation symbol. If the noise and non-linearity do not move the vector outside of the cloud, proper symbol recovery is possible. (See FIG. 11.) If the constellation point were to repeatedly appear in the same small area within the cloud, the overall cloud size could be reduced. This could lead to greater accuracy and speed in the decoding of the point. In addition, the size of this cloud limits how many points can be included within the entire constellation diagram. If the cloud for each point were smaller, then more point symbols could be added to the constellation and still be properly decoded. Both of these situations help to raise the possible throughput rate.

Reduction of noise and non-linearity are the keys to reducing the size of the cloud of uncertainty. The modem, if properly designed, may control much of the system's non-linearity and noise. However, the modem's design does not control the effects of non-linearity and noise added to the transmission signal by communication channels such as Telco lines. The present invention provides a method to help reduce the effect of the Telco line noise and non-linearity that is added to the transmitted signal.

Figure 7:
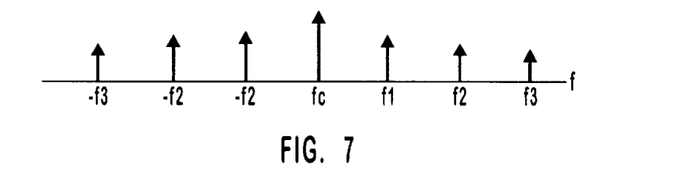
FIG. 7 depicts a spectral plot of the enhanced signal prior to transmission across a communication channel, in accordance with a preferred embodiment of the present invention.

FIG. 7 shows the spectrum of the enhanced signal prior to transmission. When compared to FIG. 6, it can be seen that the lower amplitude spectral energy (F1–F3) has been increased in magnitude. The larger magnitude signals are increased by lesser amounts. The largest signal, fc in the present example, has not been increased. Fc is usually an indication of the carrier frequency. The actual existence of this carrier may or may not be present in the transmitted signal. It would actually only be present if the same periodic signal were repeatedly sent. The magnitude of the spectral energy would be increased and/or additional spectral energy may be added to or removed from the signal, if needed, to translate the constellation point to it's new position. This new translated location will have a different magnitude and/or phase when compared to the original position. For example N2 is moved to N2' in FIG. 8.

Figure 9:
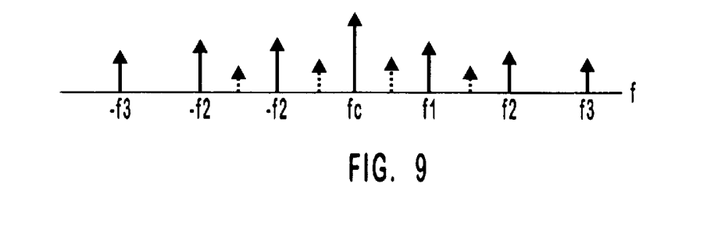
FIG. 9 depicts a spectral plot of the received signal after enhancement of the signal and propagation across the communication channel in accordance with a preferred embodiment of the present invention.
Figure 10:
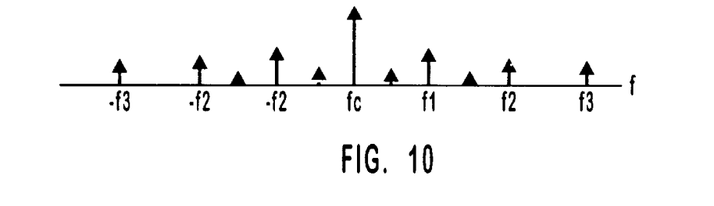
FIG. 10 depicts a spectral plot of an enhanced received signal following a normalization process, in accordance with a preferred embodiment of the present invention.
Figure 11:
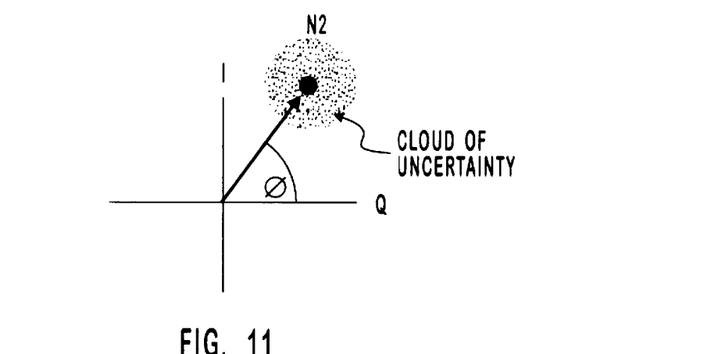
FIG. 11 depicts a constellation point in a QAM embodiment subjected to noise, in accordance with an embodiment of the present invention.

After the signal has been enhanced, and sent down the transmission line, the receiver modem sees the spectral energy content as shown in FIG. 9. The added signals represent noise picked up on the Telco lines. It is this added noise that is responsible for incorrectly positioning the vector at the exact location it was at before transmission. Since this noise is random, it will locate the final vector at a slightly different location. If it lies within the cloud of uncertainty, the modem may recover the symbol from the vector. If the noise is too extreme, the symbol is lost and must be re-transmitted. (See FIG. 11.)

Figure 8:
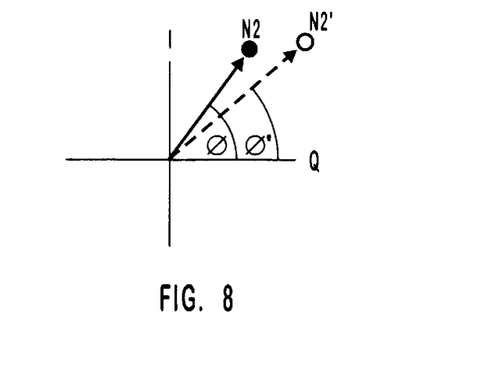
FIG. 8 depicts the magnitude and phase shift of a constellation point resulting from the enhancement process, in accordance with a preferred embodiment of the present invention.
Figure 12:
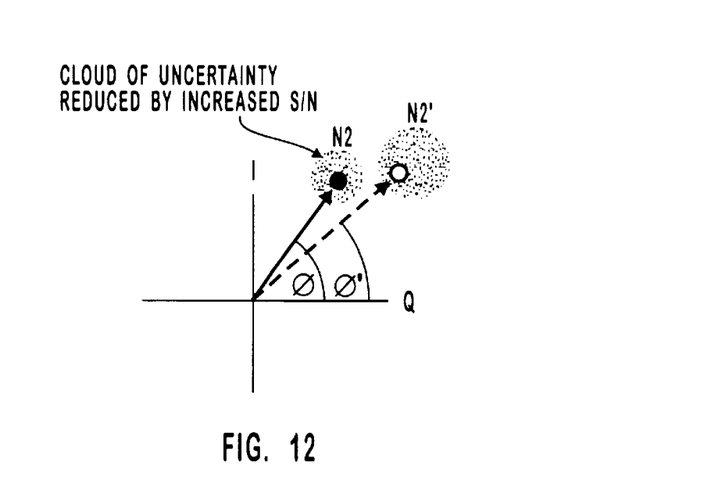
FIG. 12 depicts a shifted constellation point in a QAM embodiment undergoing an enhancement/dehancement process, in accordance with a preferred embodiment of the present invention.

When the signal is received, the enhanced signals, within the band of noise, are de-enhanced. In the process of reducing the spectral energy back to its normal level, the noise spectral energy is reduced. (See FIG. 10.) This increases the signal-to-noise ratio and reduces the size of the cloud of uncertainty. This brings the vector back to its proper location before transmission. The constellation point is represented by the vector. It will now be closer to the exact position that it was at, just prior to enhancement and transmission. It is then easier to recover the correct constellation symbol. In addition, the smaller cloud of uncertainty would allow more constellation points to be added to the entire constellation pattern, if desired, which also raises the throughput rate. (See FIG. 12.) N2' is the location of the vector prior to de-enhancement. N2 is the location of the vector after de-enhancement. It will be a close representation of N2 as seen in FIG. 8. Compare the cloud of uncertainty size between FIG. 11 and FIG. 12 of point N2. The reduced size difference may be noted as depicted.

Figure 13:
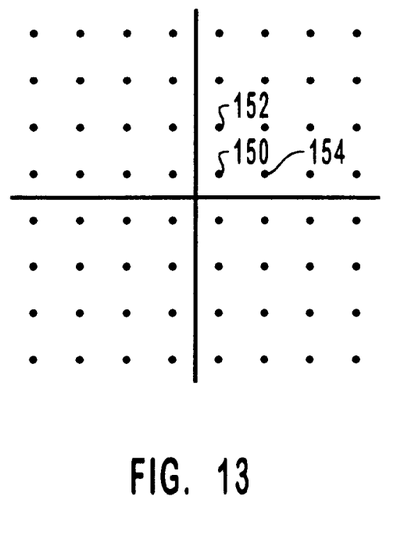
FIG. 13 depicts a non-compressed constellation of quadrature amplitude modulated symbols, as utilized in a preferred embodiment of the present invention.

FIG. 13 is a depiction of a constellation of quadrature amplitude modulated symbols without undergoing the compressive effects of the present invention. Traditional quadrature amplitude modulation employs a large number of low-amplitude or low-magnitude symbols or elements in its constellation pattern. Those skilled in the art of quadrature amplitude modulation appreciate that a particular symbol may represent a series or pattern of bits of information. Coding such symbols in an array having a magnitude and phase from the origin provides a method for transferring a series of bits using such a modulation technique by varying the magnitude and phase in the transmitted analog wave form. It is appreciated by those of skill in the art that injected channel noise may cause deviations to the magnitude and phase associated with the symbols of the constellation. The presence of such channel noise gives the appearance, when depicted graphically, of a "cloud" hovering about the constellation point. It should be further appreciated that changes in magnitude and phase have a greater effect upon constellation points nearer to the origin than on those symbols or constellation points located distant from the origin.

Furthermore, it should be appreciated that channel noise levels typically have smaller magnitudes thereby affecting or contaminating constellation points or symbols located closer to the origin. Three such constellation points located near the origin are depicted as constellation points 150, 152 and 154, which when subjected to the method and apparatus of the present invention are relocated or reassigned different locations as depicted in FIG. 14.

Figure 14:
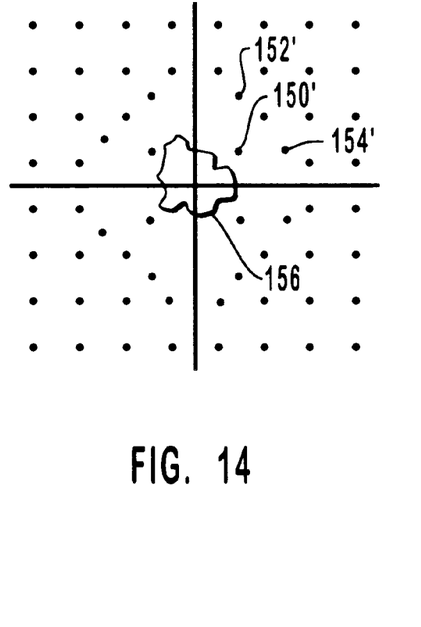
FIG. 14 depicts a compressed constellation of quadrature amplitude modulated symbols, in accordance with a preferred embodiment of the present invention.

FIG. 14 is a depiction of a quadrature amplitude modulated constellation employing compression level information for boosting low-magnitude input signal constellation points, in accordance with a preferred embodiment of the present invention. As described in FIG. 13, the larger-magnitude constellation points exhibit a similar uniformity in magnitude and phase as the quadrature amplitude modulation constellation points that are not subjected to the enhancement process of the present invention. However, the communication channel noise resident within a communication channel exhibits low-magnitude with varying and often random phase components. FIG. 14 depicts exemplary low-magnitude noise as channel noise 156 having generally low-magnitude levels. While the magnitude levels of channel noise 156 are relatively low, such magnitudes may interfere with low-magnitude constellation points and even consume or obscure such small-magnitude constellation points. Even when the magnitude of channel noise 156 does not exceed the magnitude of the constellation point having the smallest magnitude, the signal-to-noise ratio or distance between channel noise 156 and low-magnitude constellation points becomes marginal and a determination and extraction of a low-magnitude constellation point from channel noise 156 becomes difficult and problematic.

In the present invention, the low-magnitude constellation point of the quadrature amplitude modulated constellation, illustrated as constellation points 150', 152' and 154' are reassigned or relocated at an increased distance from the origin. Such relocation may take the form of increased magnitude-only or may also include a phase change to maximize the certainty region between constellation points that enables a receiver to discern the precise nature of a symbol and assign the corresponding bit pattern to the reception of the symbol. It should be noted that as the magnitude of channel noise 156 increases, the constellation points become increasingly more congested and susceptible to erroneous decoding. However, the present invention facilitates the improvement the signal-to-noise ratio for noise levels characteristic of traditional ambient channel noise as opposed to spurious channel noise conditions which typically exhibit larger magnitudes and intermittent noise characteristics less well accommodated by the present invention.

Figure 15:
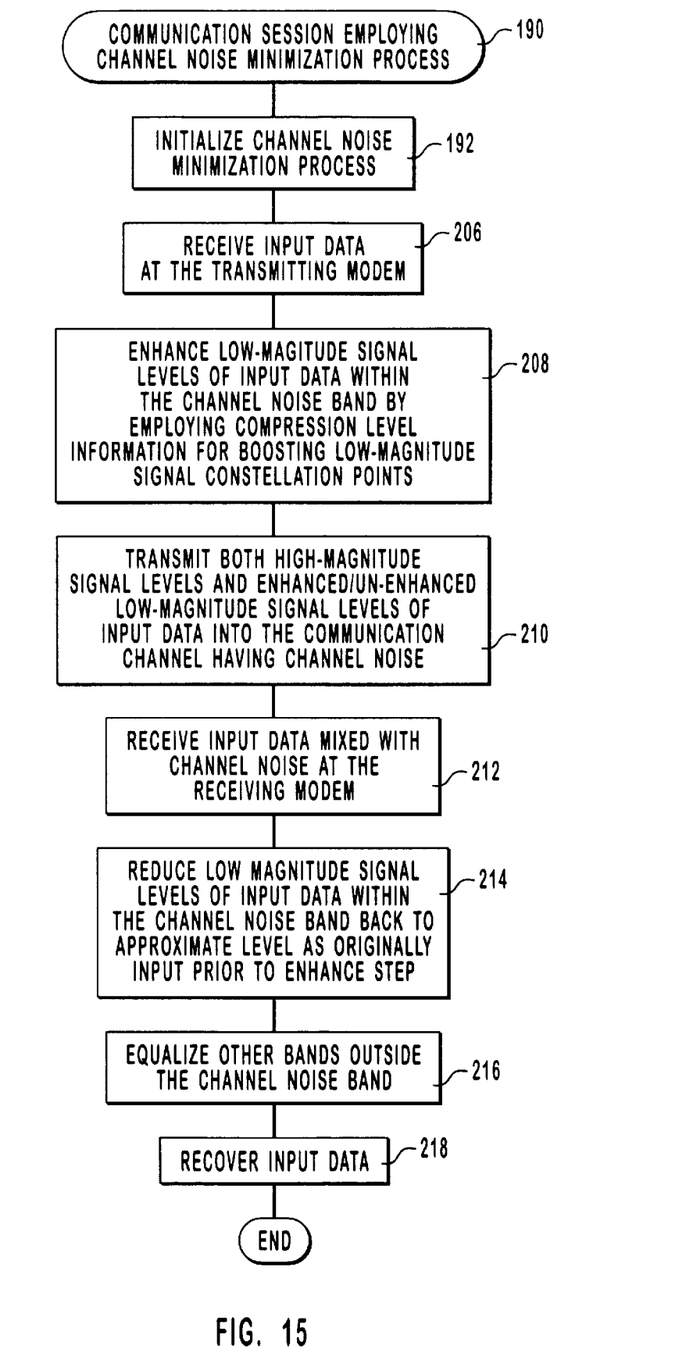
FIG. 15 is a flowchart of a channel noise minimization process, in accordance with a preferred embodiment of the present invention.

FIG. 15 depicts a flowchart for employing a channel noise minimization process, in accordance with a preferred embodiment of the present invention. In a communication session employing channel noise minimization process 190, a communication channel is established between a transmitting modem and a receiving modem which inherently injects noise into the input signal transferred therebetween. Such an injection of ambient noise often takes the form of a background hiss or other low-magnitude yet potentially interfering signal. The present invention utilizes the reality that the composition of background noise generally exhibits a Gaussian distribution within the selected data bandwidth, with the center of the distribution generally taking on the dominant frequency band of the line noise. The present process utilizes a pre- and post-equalization with the gain of the equalization being based on the level and frequency of the signal.

Figure 16:
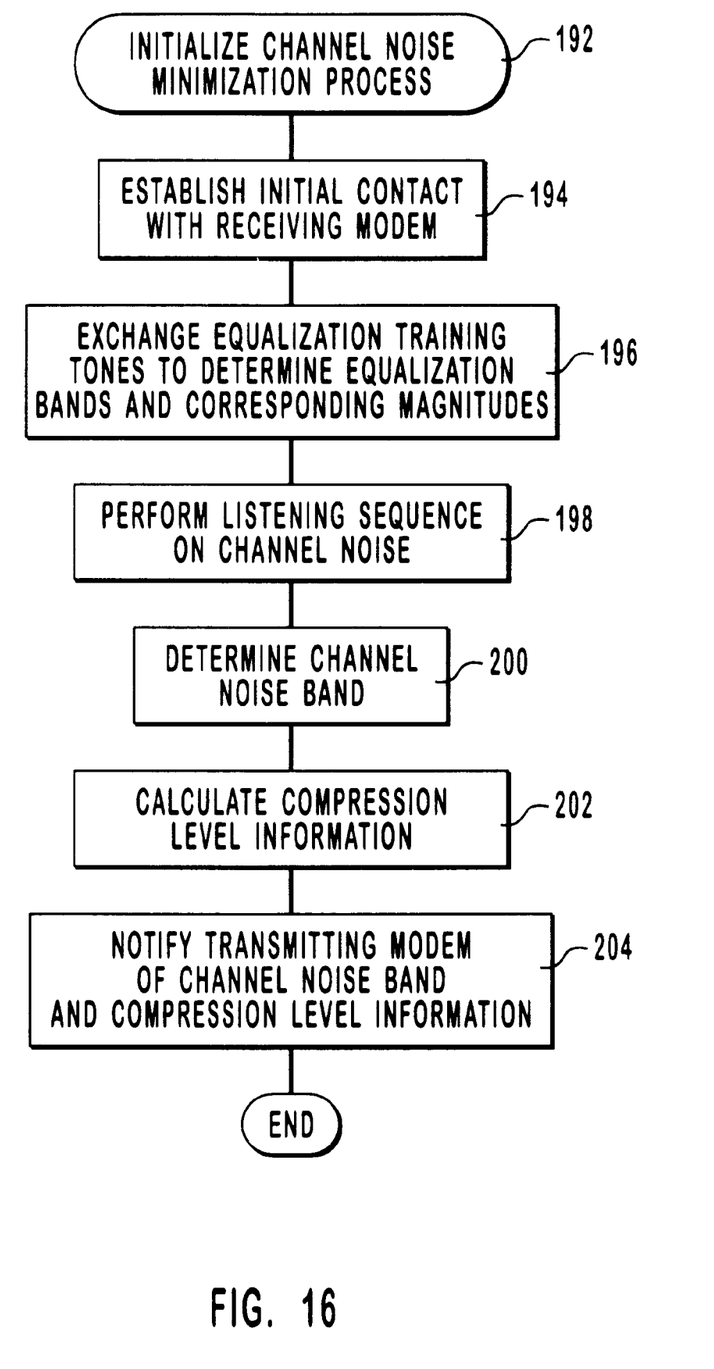
FIG. 16 is a flowchart of an initialization process for minimizing channel noise, in accordance with a preferred embodiment of the present invention.

A step 192 initializes the channel noise minimization process as depicted in FIG. 16. The initialization process initializes both the transmitting modem and receiving modem for the subsequent exchange of input signal information. Referring to FIG. 16, initialize channel noise minimization process 192 commences with a step 194 wherein a connection or communication channel is established between a transmitting and receiving modem. The establishment of a communication channel may take various forms and may employ various communication standards such as V.32, V.34, among other established protocols. The exemplary initialization process may include a negotiation of a data transfer rate, error correction modes and other transfer protocol parameters known by those of skill in the art.

Another preferred embodiment of the present invention incorporates a step 196 wherein equalization training tones are exchanged between the transmitting and receiving modems to determine the equalization bands and the corresponding magnitudes of such bands. It should be pointed out that a transmitting and receiving modem in a full duplex system may reverse the roles with a transmitting modem assuming the role of a receiving modem, and vice-versa, when a transfer of communication information is dispatched in the opposite direction. The process for exchanging equalization training tones generally takes the form of a transmission of a predetermined frequency and magnitude of specific tones from the transmitting modem which are received by the receiving modem and evaluated therein. The evaluation may take the form of determining the frequency and magnitude of the received tone and comparing such magnitude and frequency with established standards or values which are anticipated by the receiving modem. Any discrepancies in the frequency and magnitude of the training tones received in the bands are then compensated for by the receiving modem in subsequent receptions of signal information in the exemplary bands.

The present invention further incorporates a step 198 wherein the transmitting modem ceases transmissions for a brief "listening" period to the receiving modem. The receiving modem thereafter monitors the silent communication channel to determine the inherent ambient emanations propagating across the communication channel or injected by the communication channel. The communication channel noise or ambient background noise inherent to the communication channel and/or other devices connected therewith, generally takes the form of low-magnitude signals having a Gaussian distribution as described above.

In a step 200, upon receiving the communication channel noise, the receiving modem performs an evaluation of the received noise to determine a channel noise band. The evaluation, in one embodiment of the present invention, takes the form of a frequency evaluation of the received communication channel noise. Such an evaluation may be performed using a fast Fourier transform on the received communication channel noise to determine a frequency spectrum associated with the communication channel noise. A frequency evaluation of the communication noise yields a bandwidth and a center frequency about which the noise is distributed thereby defining the channel noise band.

An evaluation of the communication channel noise also yields a magnitude, phase and frequency associated with such channel noise for use in determining or calculating compression level information as performed in a step 202. Calculation of the compression level information is performed by evaluating the magnitude, phase and frequency associated with the communication channel noise and determining a compression level for each of the lower-magnitude modulation values as depicted in FIG. 3. It should be reiterated that while the communication channel noise magnitude generally has a fixed level, the compression of the lower magnitude modulation points may exhibit a rippling or compressive effect on other most adjacent modulation points as generally depicted in both FIGS. 3 and 14. It should be further pointed out that the compressive effect of the modulation points lessens as the magnitude of the modulation points increase. Therefore, the process of skewing the low-magnitude modulation points to a higher-magnitude position inherently increases the signal-to-noise ratio between the low-magnitude modulation points with respect to the channel noise.

A step 204 thereafter notifies the transmitting modem of the channel noise band and compression level information as calculated and derived in the preceding steps. A suitable notification process may include a packetized message structure wherein both the channel noise band and compression level information are conveyed from the receiving modem to the transmitting modem. Upon completion of step 204, processing returns from the initialization channel noise minimization process 192, as described in FIG. 16, to communication session employing channel noise minimization process 190 of FIG. 15.

A step 206 receives input signals or data at the transmitting modem for preparation prior to dispatch to the receiving modem. It should be pointed out that the input data, in one preferred embodiment, takes the form of digital data received from the transmitting computer coupled to the transmitting modem which thereafter undergoes digital modulation within a digital signal processor or other processing device. In prior art embodiments, the resulting digitally modulated data is comprised of high-magnitude input signals and low-magnitude input signals which are thereafter converted from digital to analog form for propagation across the communication channel. Such prior art systems transmitted both the high-magnitude and untreated low-magnitude input signals across the communication channel thereby exposing the low-magnitude input signals to the channel noise of the communication channel which exhibits a magnitude of near unity with the low-magnitude input signals.

In the present invention, the digital signal processor of the transmitting modem utilizes the channel noise band and compression level information received during the initialization process to pre-process or skew the low-magnitude input signals accordingly. In a step 208, the low-magnitude input signals occurring within the channel noise band are enhanced by employing the compression level information to boost the low magnitude input signal modulation points. Such enhanced low-magnitude input signals thereafter undergo a digital-to-analog conversion for transmission across the communication channel. Because the magnitudes of the low-magnitude input signals occurring within the communication noise band have been augmented with respect to the channel noise, the signal-to-noise ratio between the enhanced low-magnitude input signals and the communication channel noise has been improved.

In an embodiment employing quadrature amplitude modulation, the enhancement process comprises the step of boosting the magnitude of the quadrature amplitude constellation points occurring within the channel noise band that represent the low-magnitude input signals according to the compression level information. Another embodiment incorporates phase shifting of the constellation points in addition to magnitude-only shifting to compress the lower-magnitude constellation points beyond the noise region. A step 210 transmits both high-magnitude signal level data and low-magnitude signal level data including enhanced low-magnitude signal level data that coincides with the channel noise band. The transmitted data is dispatched through the same communication channel that was previously evaluated during the listening and initialization phase. The transmitted data in the communication channel is subjected to the channel noise and the effects associated therewith.

The receiving modem in a step 212 receives the input data mixed with the channel noise and undertakes processing the received data. In a step 214 the receiving modem, utilizing the channel noise band and compression level, phase and frequency information determined in the initialization phase, reduces the low-magnitude signal level, phase and frequency change data coinciding with the channel noise band. The reduction of such signal levels, phase and frequency change approximates the magnitude, phase and frequency of the original input data thereby reversing the effects of the enhancement step. The reduction of the signals occurring within the channel noise band additionally proportionally reduces the level of the channel noise occurring within the channel noise band. Such a reduction in the channel noise preserves a signal-to-noise ratio as enjoyed during the propagation process.

In another preferred embodiment, a step 216 performs the equalization of other bands outside of the channel noise band and on signal amplitudes within the noise band adjusted relative to the compression thresholds, using the equalization information gained in the preliminary equalization training tone process. It should be pointed out that other training or compensatory learning procedures may be performed that are contemplated as being included within the scope of the present invention. A step 218 thereafter recovers the input data for traditional processing by the digital signal processor or other processing elements within the communication system.

Figure 17:
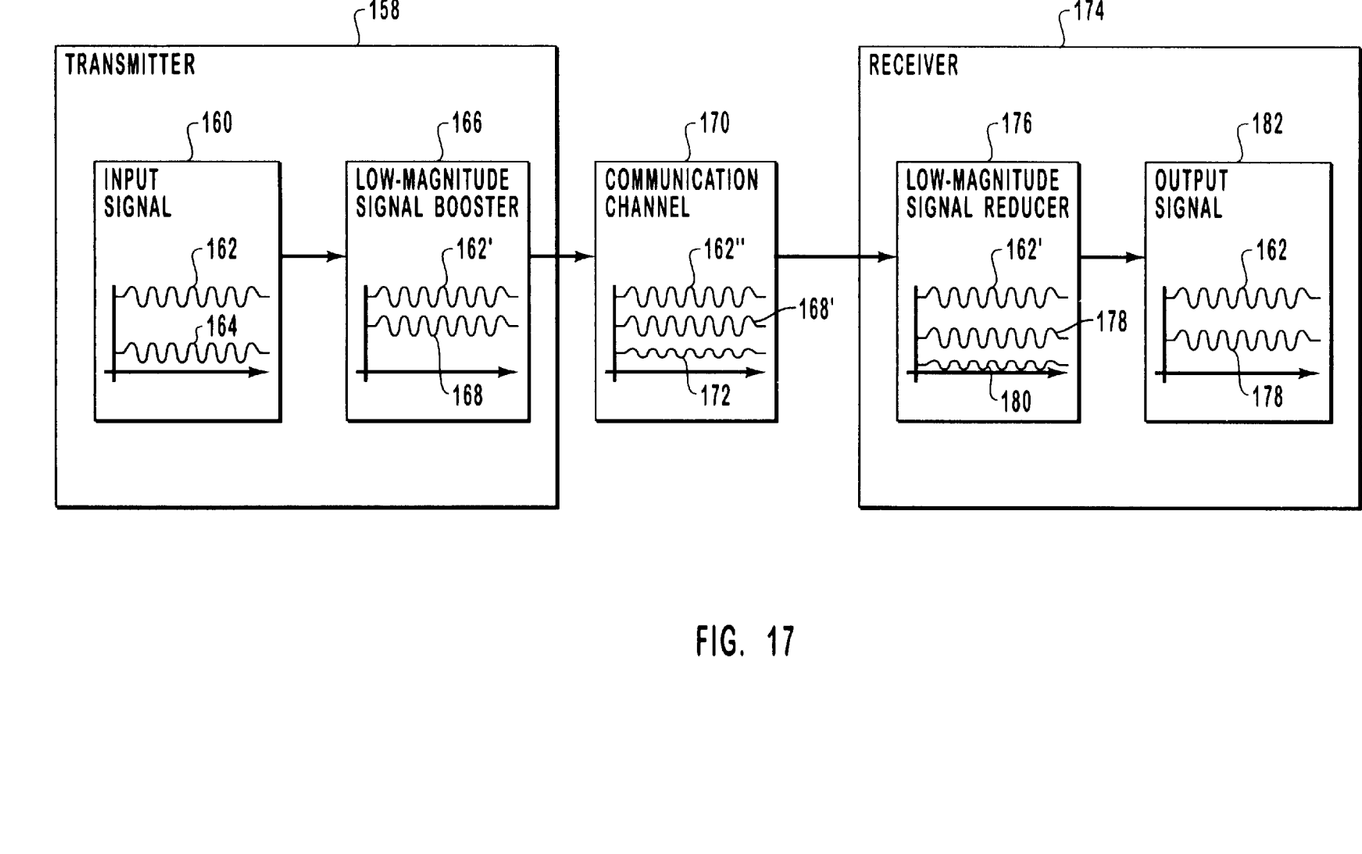
FIG. 17 is a graphical depiction of a method for improving the signal-to-noise ratio of low-magnitude input signals, in accordance with a preferred embodiment of the present invention.

FIG. 17 is simplified depiction of the wave forms undergoing a process for improving the signal-to-noise ratio of low-magnitude input signals occurring in the channel noise band, in accordance with a preferred embodiment of the present invention. To implement the compression or companding described above, a listening or initialization process is undertaken prior to the transfer of data across the communication channel, such as the initialization process described above in FIGS. 15 and 16. The initialization process may also be preceded by an equalization training process wherein tones are exchanged to develop an equalization curve for the transmitted data information also described above. Following the listening process which determines the spectrum and level of the background noise, the channel noise band and compression level information are transferred from the receiving modem to the transmitting modem as described above. The transmitting modem in turn utilizes the channel noise band information and compression level information to set the compression ratio for a determined level as a function of the frequency of the input data signal. Both the transmitting and receiving modem retain the requisite compression level information and channel noise band for respectively enhancing and reducing the low-magnitude input signals occurring in the channel noise band.

Once the initialization process has been completed, the input signal data may be transferred from the transmitting modem to the receiving modem, as depicted in FIG. 17. A transmitting modem 158 receives an input signal 160 which is comprised of high-magnitude input signals 162 and low magnitude input signals 164. A processor or other computational device such as a digital signal processor is configured with a level or a threshold below which input signals are classified as low-magnitude input signals, thus benefitting from the signal-to-noise improvement method of the present invention. Transmitting modem 158, when transforming the input signal into a modulated form, boosts the low-magnitude input signals that occur in the channel noise band utilizing a low-magnitude signal booster 166. It should be noted that, while higher magnitude input signals, such as those illustrated by high-magnitude input signal 162', are modulated using traditional modulation techniques such as quadrature amplitude modulation, low-magnitude input signals, such as low-magnitude input signal 168, receive a boost in magnitude and optionally a change in phase to enhance the input signal into a more propagatably robust signal level.

The input signals in their modulated form propagate through a communication channel 170 in an analog format represented as high-magnitude input signal 162" and enhanced low-magnitude input signal 168'. Low magnitude input signals (not shown) outside the channel noise band also propagate across the communication channel in an un-enhanced form. Additionally, channel noise occurring in the channel noise band affects or potentially contaminates low-magnitude input signals within a communication channel. However, as depicted in FIG. 17, the relative signal level of enhanced low-magnitude input signal 168' exhibits a favorable signal-to-noise ratio when compared with channel noise 172.

A receiving modem 174 receives the input signals including the enhanced low magnitude input signal occurring in the channel noise band, low-magnitude input signals outside of the channel noise band and high-magnitude input signals across the bands, A low-magnitude signal reducer 176 reduces the magnitude of the enhanced low-magnitude input signal 178 occurring in the channel noise band in addition to channel noise 180. The concurrent reduction of both signal magnitudes retains the favorable signal-to-noise ratio generated from the propagation of the enhanced signal. The signals are thereafter extracted as output signals 182 comprised of high-magnitude input signal 162 and low-magnitude signals 178 which approximate the original input signals 160. Therefore, by identifying the low-magnitude input signals occurring within the channel noise band and enhancing such signals prior to subjecting those signals to the degratory affects of the communication channel and its associated channel noise, low-magnitude input signals occurring within the communication channel noise band may be more reliably propagated through the communication channel.

Figure 18:
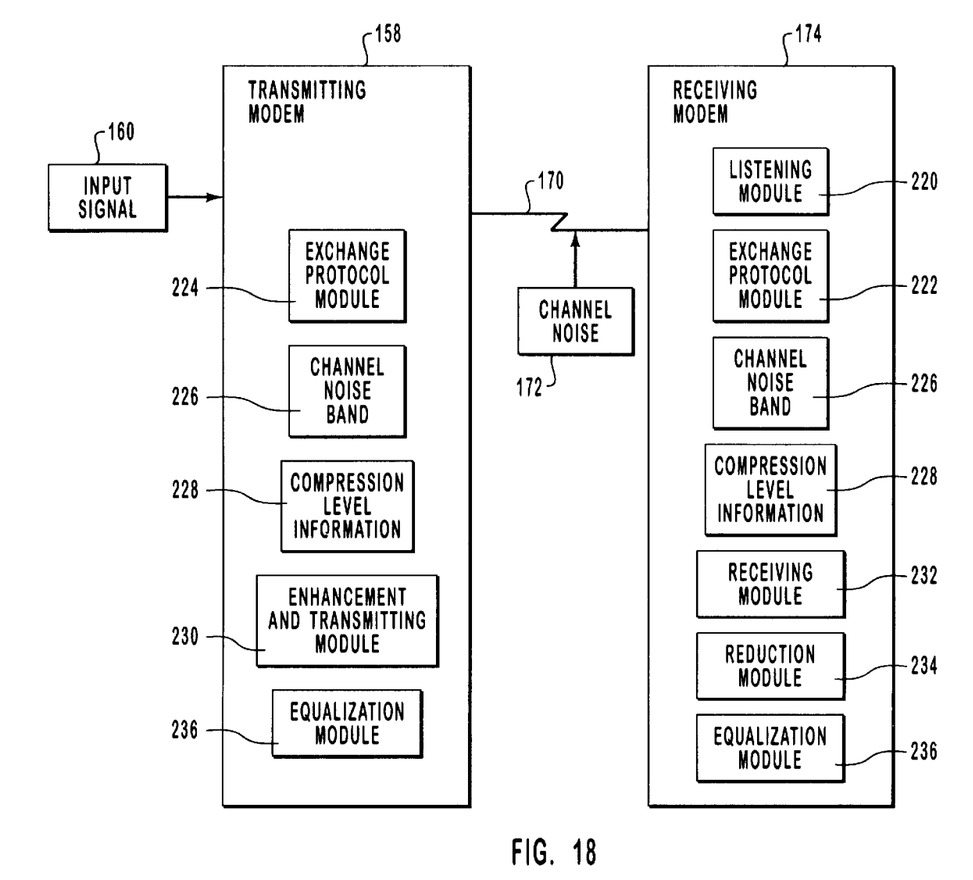
FIG. 18 is a simplified block diagram of an apparatus for improving the signal-to-noise ratio of low magnitude input signals occurring in the channel noise band, in accordance with a preferred embodiment of the present invention.

FIG. 18 is a simplified block diagram of the modules for improving the signal-to-noise ratio of low-magnitude input signals occurring in the channel noise band, in accordance with the preferred embodiment of the preferred invention. An input signal 160 is delivered to a transmitting modem 158 for traversal across a communication channel 170 to a receiving modem 174. In the preferred embodiment, the modules for executing the steps of the present invention are embodied within software modules resident within a processing system such as a digital signal processor or other processing device. Those skilled in the art will recognize that alternative devices may also be employed such as embedded processors, microcontrollers, or host signal processing resources resident within a computer environment such as a personal computer. Furthermore, the depicted modules may be combined into an integrated module or may be separately executed on support or diversified processing elements.

A receiving modem 174 is comprised of a listening module 220 for monitoring the channel noise on the communication channel and determining both the channel noise band and the compression level information in a receive or communication channel. Listening module 220 is responsive to a period of transmitting silence wherein transmitting modem 158 ceases from transmission for a brief period of time allowing receiving modem 174 to evaluate the ambient communication channel noise.

Receiving modem 174 is further comprised of an exchange protocol module 222 used in conjunction with exchange protocol module 224 of transmitting modem 158 for exchanging the communication channel noise band and compression level information as determined by receiving modem 174. Exchange protocol module 222 retains a channel noise band 226 and compression level information 228 for use in reducing the enhanced low magnitude input signals as received from the transmitter. Likewise, exchange protocol module 224, residing within transmitting modem 158, upon reception through the exchange protocol with receiving modem 174, stores and incorporates a channel noise band 226 and compression level information 228 for use in enhancing the low-magnitude input signals occurring within the channel noise band, thereby forming enhanced low-magnitude input signals for transmission to receiving modem 174.

Transmitting modem 158 is further comprised of a transmitting module 230 for performing the enhancement of the low-magnitude input signals occurring within the channel noise band as described above. Receiving modem 174 is further comprised of a receiving module 232 and a reduction module 234. Receiving module 232 receives the enhanced low-magnitude input signals in addition to receiving and interacting during the initialization process with transmitting modem 158. Reduction module 234 reduces both the enhanced low-magnitude signals, thereby approximating the low-magnitude input signal as presented to the remote or transmitting modem 158 as well as reducing the channel noise introduced by the communication channel. Such a reduction of all enhanced signals located within the channel noise band retains the favorable signal-to-noise ratio associated with the low magnitude input signals occurring within the channel noise band.

In another preferred embodiment, receiving modem 174 and transmitting modem 158 are further comprised of equalization modules 236. As described above, equalization module 236 performs an equalization training tone process wherein equalization bands and corresponding curves or magnitudes are determined for an equalization of the respective bands to a desired equalized magnitude. Those skilled in the art recognize that various methods of performing similar equalization processes may be utilized and are contemplated to be within the scope of the present invention.

A method and system for improving the signal-to-noise ratio of low-magnitude input signals occurring in the channel noise band has been described.

The present invention may be embodied in other specific forms without departing from the spirit or essential characteristics. The described embodiments are to be considered in all respects only illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a communication system having a transmitting modem interconnected with a receiving modem via a communication channel exhibiting channel noise in a channel noise band, a method for improving the signal-to-noise ratio of low-magnitude input signals occurring in said channel noise band, said method comprising the steps of:
   (a) said receiving modem listening to channel noise on a communication channel;
   (b) determining both channel noise band of said channel noise introduced by said communication channel and compression level information to increase the magnitude of said low-magnitude input signals beyond the magnitude of said channel noise;
   (c) notifying a transmitting modem of said channel noise band and said compression level information;
   (d) enhancing through said transmitting modem said low-magnitude input signals occurring in said channel noise band according to said compression level information by boosting a magnitude of quadrature amplitude modulation constellation points occurring in said channel noise band that represent said low-magnitude input signals according to said compression level information to form enhanced low-magnitude signals as transmitted to said receiving modem; and
   (e) reducing both said enhanced low-magnitude signals to approximate said low-magnitude input signal as presented to said transmitting modem and said channel noise introduced by said communication channel.

2. The method for improving the signal-to-noise ratio of low-magnitude input signals occurring in said channel noise band as recited in claim 1, wherein said method further comprises the step of prior to said listening step, exchanging equalization training tones to determine equalization bands and corresponding magnitudes.

3. The method for improving the signal-to-noise ratio of low-magnitude input signals occurring in said channel noise band as recited in claim 2, wherein said method further comprises the step of equalizing, at said receiving modem, said equalization bands of both high-magnitude input signals and bands of low-magnitude input signals occurring outside said channel noise band according to said corresponding magnitudes and equalizing high-magnitude input signal inside said channel noise band.

4. The method for improving the signal-to-noise ratio of low-magnitude input signals occurring in said channel noise band as recited in claim 1, wherein said boosting step further comprises the step of boosting a phase of constellation points occurring in channel noise band that represent said low-magnitude input signals.

5. The method for improving the signal-to-noise ratio of low-magnitude input signals occurring in said channel noise band as recited in claim 1, wherein said listening step comprises the step of said transmitting modem ceasing from transmitting while said receiving modem evaluates said channel noise on said communication channel.

6. The method for improving the signal-to-noise ratio of low-magnitude input signals occurring in said channel noise band as recited in claim 1, wherein said determining step comprises the step of performing a fast Fourier transform on said channel noise to determine both said channel noise band and said compression level information.

7. In a receiving modem for interconnecting with a transmitting modem via a communication channel exhibiting channel noise in a channel noise band, a method for improving the signal-to-noise ratio of low-magnitude input signals occurring in said channel noise band, said method comprising the steps of:
   (a) listening to said channel noise on said communication channel when interconnected with said transmitting modem;
   (b) determining both said channel noise band of said channel noise introduced by said communication channel and compression level information to increase the magnitude of said low-magnitude input signals beyond the magnitude of said channel noise;
   (c) notifying said transmitting modem of said channel noise band and said compression level information;
   (d) receiving from said transmitting modem enhanced low-magnitude signals occurring in said channel noise band as enhanced according to said compression level information, said enhanced low-magnitude signals being boosted magnitude quadrature amplitude modulated constellation points; and
   wherein said receiving from said transmitting modem enhanced low-magnitude signals occurring in said channel noise band step comprises receiving boosted magnitude quadrature amplitude modulated constellation points occurring in said channel noise band that represent said low-magnitude inputs signals according to said compression level information; and
   (e) reducing both said enhanced low-magnitude signals to approximate said low-magnitude input signal as presented to said transmitting modem and said channel noise introduced by said communication channel.

8. In a receiving modem, the method for improving the signal-to-noise ratio of low-magnitude input signals occurring in said channel noise band as recited in claim 7, wherein said method further comprises the steps of:
   a) transmitting equalization training tones to facilitate said transmitting modem to determine transmit equalization bands and corresponding transmit magnitudes; and
   b) receiving equalization training tones to determine receive equalization bands and corresponding receive magnitudes.

9. In a receiving modem, the method for improving the signal-to-noise ratio of low-magnitude input signals occurring in said channel noise band as recited in claim 8, wherein said method further comprises the step of equalizing, at said receiving modem, said equalization bands of both high-magnitude input signals and bands of low-magnitude input signals occurring outside said channel noise band according to said corresponding magnitudes, and said equalization of high-magnitude input signals occurring inside said channel noise band.

10. In a receiving modem, the method for improving the signal-to-noise ratio of low-magnitude input signals occurring in said channel noise band as recited in claim 7, wherein said receiving boosted magnitude quadrature amplitude constellation points step further comprises the step of boosting a phase of constellation points occurring in said channel noise band that represent said low-magnitude input signals.

11. In a receiving modem, the method for improving the signal-to-noise ratio of low-magnitude input signals occurring in said channel noise band as recited in claim 7, wherein said listening step comprises the step of said receiving modem evaluating said channel noise on said communication channel while said transmitting modem ceases from transmitting.

12. In a receiving modem, the method for improving the signal-to-noise ratio of low-magnitude input signals occurring in said channel noise band as recited in claim 7, wherein said determining step comprises the step of performing a fast Fourier transform on said channel noise to determine both said channel noise band and said compression level information.

13. An apparatus for improving the signal-to-noise ratio of low-magnitude input signals occurring in a channel noise band received from a remote modem via a communication channel exhibiting channel noise in said channel noise band, comprising:

(a) a listening module to monitor channel noise on said communication channel and to determine both said channel noise band and compression level information in a receive channel;

(b) an exchange protocol module to deliver said channel noise band and said compression level information to said remote modem;

(c) a receiving module to receive from said remote modem enhanced low-magnitude signals comprising boosted magnitude quadrature amplitude modulated constellation points occurring in said channel noise band as enhanced according to said compression level information; and (d) a reduction module to reduce both said enhanced low-magnitude signals to approximate said low-magnitude input signal as presented to said remote modem and said channel noise introduced by said communication channel.

14. The apparatus for improving the signal-to-noise ratio of low-magnitude input signals as recited in claim 13, further comprising an equalization module capable of transmitting and receiving equalization training tones to determine equalization bands and corresponding magnitudes.

15. The apparatus for improving the signal-to-noise ratio of low-magnitude input signals as recited in claim 14, wherein said equalization module performs equalization on said equalization bands of both high-magnitude input signals and bands of low-magnitude input signals occurring outside said channel noise band according to said corresponding magnitudes, and equalization on high-magnitude input signals inside said channel noise band.

16. The apparatus for improving the signal-to-noise ratio of low-magnitude input signals as recited in claim 13, wherein said boosted magnitude quadrature amplitude modulated constellation points are further comprised of a boosted phase to move said constellation points outside said channel noise band.

17. The apparatus for improving the signal-to-noise ratio of low-magnitude input signals as recited in claim 13, wherein said modules are executed within a digital signal processor.

\* \* \* \* \*